(12) United States Patent
Muruyandy

(10) Patent No.: US 12,357,980 B2
(45) Date of Patent: Jul. 15, 2025

(54) APPARATUS AND METHOD FOR COATING SUBSTRATES WITH WASHCOATS

(71) Applicant: Johnson Matthey Public Limited Company, London (GB)

(72) Inventor: Kumarasen Muruyandy, Negeri Sembilan (MY)

(73) Assignee: Johnson Matthey Public Limited Company, London (GB)

( * ) Notice: Subject to any disclaimer, the term of this patent is extended or adjusted under 35 U.S.C. 154(b) by 762 days.

(21) Appl. No.: 17/644,885

(22) Filed: Dec. 17, 2021

(65) Prior Publication Data

US 2022/0193651 A1 Jun. 23, 2022

Related U.S. Application Data

(60) Provisional application No. 63/199,393, filed on Dec. 23, 2020.

(51) Int. Cl.
| | | |
|---|---|---|
| *B01J 37/02* | (2006.01) | |
| *B01D 37/02* | (2006.01) | |
| *B01D 46/24* | (2006.01) | |
| *B01J 35/56* | (2024.01) | |
| *B05D 3/04* | (2006.01) | |
| *F01N 3/022* | (2006.01) | |
| *F01N 3/035* | (2006.01) | |

(52) U.S. Cl.
CPC .......... *B01J 37/0217* (2013.01); *B01D 37/02* (2013.01); *B01D 46/2403* (2013.01); *B05D 3/0493* (2013.01); *B01J 35/56* (2024.01); *F01N 3/022* (2013.01); *F01N 3/035* (2013.01)

(58) Field of Classification Search
CPC .... B01J 37/0217; B01J 35/56; B01J 37/0215; B01D 37/02; B01D 46/2403; B05D 3/0493; B05D 7/22; B05D 2203/30; F01N 3/022; F01N 3/035; B05C 9/10; B05C 7/04; B05C 11/1028; B05C 5/02; B05C 5/0225; B28B 19/0023; F16K 23/00
See application file for complete search history.

(56) References Cited

U.S. PATENT DOCUMENTS

| | | |
|---|---|---|
| 6,257,445 B1 | 7/2001 | Means et al. |
| 2002/0139818 A1 | 10/2002 | McGuffey |

(Continued)

FOREIGN PATENT DOCUMENTS

| | | |
|---|---|---|
| CN | 209034710 | 6/2019 |
| DE | 3212089 A1 | 10/1983 |

(Continued)

*Primary Examiner* — William P Fletcher, III

(57) ABSTRACT

An apparatus and a method for coating substrates with washcoats in which a substrate (10) is engaged with a headset (6) of a substrate coating apparatus (1) below a washcoat showerhead (5) are disclosed. The washcoat is discharged from the washcoat showerhead (5) onto an upper surface (12) of the substrate under control of a valve assembly (4) before being drawn through the substrate by use of a vacuum generator (7). The valve assembly (4) comprises an outlet valve movable between a closed state and an open state. The valve assembly (4) creates a pressure drop within an interior of the washcoat showerhead (5) when the outlet valve moves from its open state to its closed state.

6 Claims, 8 Drawing Sheets

(56) References Cited

U.S. PATENT DOCUMENTS

| | | | |
|---|---|---|---|
| 2006/0283987 A1* | 12/2006 | Anderson | B05C 5/0275 |
| | | | 239/570 |
| 2008/0145531 A1* | 6/2008 | Rosynsky | B05D 3/042 |
| | | | 427/231 |
| 2012/0021896 A1* | 1/2012 | Nakano | B05B 1/14 |
| | | | 502/100 |
| 2013/0105524 A1 | 5/2013 | Saine | |
| 2020/0171529 A1 | 6/2020 | Burgess et al. | |

FOREIGN PATENT DOCUMENTS

| | | |
|---|---|---|
| DE | 102013112337 A1 | 5/2015 |
| GB | 2580515 A | 7/2020 |
| GB | 2580516 A | 7/2020 |
| KR | 20120077930 A | 7/2012 |
| KR | 20120100443 A | 9/2012 |
| WO | 2015145122 A2 | 10/2015 |

* cited by examiner

APPARATUS AND METHOD FOR COATING SUBSTRATES WITH WASHCOATS

The present disclosure relates to apparatus and methods for coating substrates with washcoats. In particular, it relates to the coating of substrates used for purification of exhaust gases.

BACKGROUND TO THE DISCLOSURE

A substrate for purification of exhaust gases may typically comprise a monolithic substrate that is provided with passages for the through-flow of exhaust gases. The substrate may be provided with a coating, which may be a catalytic coating. The coating may be applied to the substrate as a washcoat that is passed through the passages of the substrate. Various methods for applying the coating to a substrate are known. One such method involves applying washcoat to a first face of the substrate (e.g. an upper face) and subjecting an opposite, second face (e.g. a lower face) of the substrate to at least a partial vacuum to achieve movement of the washcoat through the passages. After coating the substrate may be dried and calcined.

The substrate may be configured as a flow-through substrate wherein each passage is open at both the first and second faces of the substrate and the passage extends through the whole length of the substrate. Consequently, exhaust gases entering through a first face of the substrate into a passage pass through the substrate within the same passage until the exhaust gases exit a second face of the substrate. Alternatively, the substrate may be configured as a filter substrate, in which some passages are plugged at a first face of the substrate and other passages are plugged at a second face of the substrate. In such a configuration, exhaust gases entering through a first face of the substrate into a first passage flow along that first passage part-way along the substrate and then pass through a filtering wall of the substrate into a second passage. The exhaust gases then pass along said second passage and out of the second face of the substrate. Such an arrangement has become known in the art as a wall-flow filter.

The coated flow-through substrate may comprise a three way catalyst (TWC), a selective catalytic reduction (SCR) catalyst, a diesel oxidation catalyst (DOC), a lean NOx trap catalyst (LNT), an ammonia slip catalyst (ASC), a combined selective catalytic reduction catalyst and ammonia slip catalyst (SCR/ASC), or a passive NOx adsorber (PNA).

The coated filter substrate, for example, be a catalysed soot filter (CSF) comprising an oxidation catalyst, a selective catalytic reduction filter (SCRF) comprising a selective catalytic reduction (SCR) catalyst, a lean NOx trap filter (LNTF) comprising a NOx adsorber composition, a gasoline particulate filter (GPF) comprising a three-way catalyst composition, or a filter substrate comprising a selective catalytic reduction (SCR) catalyst and an ammonia slip catalyst (ASC).

The substrate may be made or composed of a ceramic material or a metallic material. For example, the substrate may be made or composed of aluminium titanate, cordierite ($SiO_2$—$Al_2O_3$—$MgO$), silicon carbide (SiC), Fe—Cr—Al alloy, Ni—Cr—Al alloy, or a stainless steel alloy.

The substrate will commonly have a substrate body which has a uniform cross-sectional shape along its longitudinal length. Typically, the substrate body may have a circular or near circular shape in cross-section, although other cross-sectional shapes are possible, for example square and rectangular. An upper surface of the substrate body may be defined as the face that is positioned uppermost during coating and likewise a lower surface of the substrate body may be defined as the face that is positioned lowermost during coating. Commonly, the upper face and lower face are planar and orthogonal to the longitudinal axis of the substrate body.

When coating substrates it may typically be desirable to achieve a substantially 'flat' washcoat profile—i.e. achieving a leading 'front' or 'edge' of the washcoat (marking the boundary interface between the coated and uncoated portions of the substrate) that is substantially flat or perpendicular to the longitudinal axis of the passages.

An uneven washcoat profile can result in a detrimental effect to the operational efficiency of the substrate. For example, uneven profiles may lead to portions of the substrate being uncoated (which reduces the catalytic efficiency of the substrate) or portions of the substrate being unintentionally coated more than once—where multiple doses of washcoat are applied (which can deleteriously increase the back pressure of the substrate). In some circumstances washcoat may be fully pulled through the substrate body and emerge from the lower surface.

To achieve an even washcoat profile it may be desirable to achieve an even depth of the washcoat over the upper surface of the substrate before the substrate is drawn through the substrate. Factors including the evenness of the depositing of the washcoat onto the upper surface and the rate of spread of the washcoat when on the upper surface may affect the depth of the washcoat across the upper surface.

Another factor that can affect performance is dripping or leakage of washcoat from the washcoat showerhead. The showerhead is described, for example, in WO2015145122. Such leakage or dripping (after the desired volume of washcoat has been discharged from the washcoat showerhead) may lead to excess washcoat on the upper surface. This may result in a reduced economy of operation due to wastage of washcoat. It may also lead to washcoat being fully pulled through portions of the substrate body so as to emerge from the lower surface. This can lead to potential blocking of the passage openings on the lower face of the substrate. Such leakage and dripping can also lead to deposits being left on the upper surface which may block passage openings on the upper face of the substrate and may result in visual degradation of the substrate which is found undesirable by customers.

SUMMARY OF THE DISCLOSURE

In a first aspect the present disclosure provides a method of coating a substrate with a washcoat, comprising the steps of:

engaging the substrate with a headset of a substrate coating apparatus so as to locate an upper surface of the substrate below a washcoat showerhead of the substrate coating apparatus;

conveying washcoat from a source of the washcoat towards the washcoat showerhead;

using a valve assembly to control flow of the washcoat from the source into an interior of the washcoat showerhead;

discharging the washcoat out of the washcoat showerhead onto the upper surface of the substrate; and drawing the washcoat through the substrate by applying a suction force to a lower surface of the substrate;

wherein the valve assembly comprises an outlet valve movable between a closed state and an open state to control flow of washcoat into the interior of the washcoat showerhead and the valve assembly creates a pressure drop within an interior of the washcoat showerhead when the outlet valve moves from its open state to its closed state.

Advantageously, the method may mitigate dripping and or leakage of washcoat from the washcoat showerhead after the valve assembly has been closed. The pressure drop within the interior of the washcoat showerhead may act to create a suction force which reduces or prevents dripping or leakage of the washcoat.

The outlet valve may comprise a valve stem that reciprocates relative to a valve seat.

The valve stem, or a valve seal provided on the valve stem, may sealingly engage the valve seat in the closed state of the outlet valve. Optionally, the valve stem, or the valve seal provided on the valve stem, may sealingly engage a downstream face of the valve seat in the closed state of the outlet valve.

The valve stem or the valve seal may be pulled into sealing engagement with the valve seat in the closed state of the outlet valve.

The valve stem may extend through the valve seat in both the open state and the closed state.

The valve assembly may create a pressure drop within a valve chamber of the valve assembly when moving from the open state to the closed state.

The valve stem may function as a piston within the valve chamber and create a pressure drop within the valve chamber when moving from the open state to the closed state The valve stem may extend towards the outlet when the outlet valve moves into its open state and retract away from the outlet when the outlet valve moves into its closed state.

A capacity of the valve chamber able to accommodate washcoat may be greater in the closed state of the outlet valve than in the open state of the outlet valve.

The valve stem may be moved by a valve stem actuator. The valve stem actuator may be a pneumatic, hydraulic or electro-mechanical actuator.

Within the washcoat showerhead, the washcoat may enter centrally into an upper portion of the interior, then flow towards a periphery of the interior, and may then be directed down into a lower portion of the interior and then be directed to flow inwards within the lower portion towards a centre of the washcoat showerhead.

The washcoat may be discharged from the lower portion of the interior through an array of apertures arranged in a lower layer of the washcoat showerhead. The pressure drop within the interior of the washcoat showerhead may act to create a suction force at the array of apertures which reduces or prevents dripping or leakage of the washcoat.

In a second aspect the present disclosure provides a substrate coating apparatus comprising:
a source of a washcoat;
a washcoat showerhead for discharging the washcoat towards an upper surface of a substrate;
a headset for engaging the substrate to locate the upper surface of the substrate below the washcoat showerhead; and
a vacuum generator for drawing the washcoat discharged from the washcoat showerhead through the substrate;
the substrate coating apparatus further comprising a valve assembly for controlling flow of washcoat into the washcoat showerhead, the valve assembly comprising:
an inlet for receiving the washcoat supplied from the source of washcoat;
an outlet for supplying the washcoat to the showerhead; and
an outlet valve movable between a closed state and an open state to control flow of washcoat out of the outlet;
wherein the valve assembly is configured to create a pressure drop within an interior of the washcoat showerhead when the outlet valve moves from its open state to its closed state.

Advantageously, the substrate coating apparatus may mitigate dripping and or leakage of washcoat from the washcoat showerhead after the valve assembly has been closed. The pressure drop within the interior of the washcoat showerhead may act to create a suction force which reduces or prevents dripping or leakage of the washcoat.

The outlet valve may comprise a valve stem configured for reciprocating movement relative to a valve seat.

The valve stem, or a valve seal provided on the valve stem, may be configured to sealingly engage the valve seat in the closed state of the outlet valve. The valve stem, or the valve seal provided on the valve stem, may be configured to sealingly engage a downstream face of the valve seat in the closed state of the outlet valve.

The valve stem or the valve seal may be configured to be pulled into sealing engagement with the valve seat in the closed state of the outlet valve by a valve stem actuator.

The valve stem may extend through the valve seat in both the open state and the closed state.

The valve assembly may further comprise a valve chamber.

The valve assembly may be configured to create a pressure drop within the valve chamber when moving from the open state to the closed state.

The valve stem may be configured to function as a piston within the valve chamber to create a pressure drop within the valve chamber when moving from the open state to the closed state.

The valve chamber of the valve assembly may be sealed in a fluid-tight manner to the interior of the washcoat showerhead.

The valve stem may be extended towards the outlet when the outlet valve moves into its open state and be retracted away from the outlet when the outlet valve moves into its closed state.

The valve assembly may be configured such that a capacity of the valve chamber able to accommodate washcoat is greater in the closed state of the outlet valve than in the open state of the outlet valve.

The valve stem may comprise an enlarged valve stem head and comprise a valve stem seal located adjacent a proximal face of the enlarged valve stem head.

The enlarged valve stem head may be located downstream of the valve seat in both the open state and the closed state.

The valve stem seal may comprise an O-ring, optionally an EPDM O-ring.

The substrate coating apparatus may further comprise a valve stem actuator. The valve stem actuator may be a pneumatic, hydraulic or electro-mechanical actuator.

The washcoat showerhead may comprise a housing comprising an upper layer having a fluid connection to the outlet of the valve assembly and a lower layer comprising an array of apertures for discharging the washcoat towards the upper surface of a substrate. The pressure drop within the interior of the washcoat showerhead may act to create a suction force at the array of apertures which reduces or prevents dripping or leakage of the washcoat.

The array of apertures may comprise a plurality of equi-spaced apertures.

An inner diameter of the or each aperture may be 1.5 to 2.5 mm, optionally about 2 mm, optionally 2 mm. The sizing of the inner diameter of each aperture may be particularly beneficial for creating the suction force at the array of apertures which reduces or prevents dripping or leakage of the washcoat.

The or each of the apertures may be defined by a tubular insert.

The tubular insert of the or each of the apertures may extend below a lower face of the lower layer by at least 1 mm, more preferably by at least 2 mm, most preferably by at least 5 mm, or by about 5 mm or by 5 mm.

The washcoat showerhead may further comprise a baffle layer, which may be configured to direct washcoat that flows centrally into an upper portion of the interior to flow towards a periphery of the interior.

The baffle layer may be configured to convey the washcoat into a lower portion of the interior at or near the periphery of the interior such that the washcoat may be subsequently directed to flow inwards across an upper face of the lower layer towards a centre of the lower layer.

The upper layer and the baffle layer may be separated by a first gap, and optionally the first gap may be 3.0 to 5.0 mm, optionally about 4.0 mm, optionally 4.0 mm.

The baffle layer and the lower layer may be separated by a second gap, and optionally the second gap may be 3.0 to 5.0 mm, optionally about 4.0 mm, optionally 4.0 mm.

The upper layer, baffle layer and lower layer may be sealed together, and optionally may comprise at least a first O-ring seal between the upper layer and the baffle layer and a second O-ring seal between the baffle layer and the lower layer.

The outlet valve may comprise a reverse poppet valve.

In a third aspect the present disclosure provides a valve assembly for a substrate coating apparatus comprising:
 a valve chamber;
 an inlet for receiving washcoat;
 an outlet for supplying the washcoat to a showerhead; and
 an outlet valve movable between a closed state and an open state to control flow of washcoat out of the outlet; wherein the valve assembly is configured to create a pressure drop within the valve chamber when the outlet valve moves from its open state to its closed state.

Advantageously, the valve assembly may mitigate dripping and or leakage of washcoat from a washcoat showerhead (when assembled therewith) after the valve assembly has been closed. The pressure drop within the interior of the valve chamber may act to create a suction force which reduces or prevents dripping or leakage of the washcoat.

The outlet valve may comprise a valve stem configured for reciprocating movement relative to a valve seat.

The valve stem may be configured to function as a piston within the valve chamber to create a pressure drop within the valve chamber when moving from the open state to the closed state.

The valve stem, or a valve seal provided on the valve stem, may be configured to sealingly engage the valve seat in the closed state of the outlet valve. The valve stem, or the valve seal provided on the valve stem, may be configured to sealingly engage a downstream face of the valve seat in the closed state of the outlet valve.

The valve stem or the valve seal may be configured to be pulled into sealing engagement with the valve seat in the closed state of the outlet valve by a valve stem actuator.

The valve stem may extend through the valve seat in both the open state and the closed state.

The valve stem may be extended towards the outlet when the outlet valve moves into its open state and be retracted away from the outlet when the outlet valve moves into its closed state.

The valve stem may comprise an enlarged valve stem head and comprise a valve stem seal located adjacent a proximal face of the enlarged valve stem head.

The enlarged valve stem head may be located downstream of the valve seat in both the open state and the closed state.

The valve stem seal may comprise an O-ring, optionally an EPDM O-ring.

The valve assembly may further comprise a valve stem actuator, and optionally the valve stem actuator may be a pneumatic, hydraulic or electro-mechanical actuator.

The outlet valve may comprise a reverse poppet valve.

In any of the above aspects the substrate maybe selected from a flow-through substrate (e.g. a monolithic flow-through substrate) or a filter substrate (e.g. a wall-flow filter substrate).

In any of the above aspects the washcoat may comprise a catalytic coating selected from a three way catalyst (TWC), a selective catalytic reduction (SCR) catalyst, a diesel oxidation catalyst (DOC), a lean NOx trap catalyst (LNT), an ammonia slip catalyst (ASC), a combined selective catalytic reduction catalyst and ammonia slip catalyst (SCR/ASC), and a passive NOx adsorber (PNA).

In any of the above aspects the washcoat may have a viscosity of 3 to 9000 cP, optionally 3 to 54 cP, optionally 32 to 576 cP, optionally 23 to 422 cP, optionally 250 to 4500 cP, optionally 500 to 9000 cP.

In the present specification all references to viscosity refer to the viscosity of the fluid as measured using a Brookfield Rotational Viscometer fitted with a Small Sample Adaptor and link hanging spindle with the sample temperature controlled at 25° C. Such viscometers are available from Brookfield Engineering Laboratories, Inc., Middleboro, MA, USA.

All measurements were taken at a shear rate of 14 s$^{-1}$. As will be common general knowledge to the skilled person, the spindle, rotational speed and viscometer model were chosen in dependence on the viscosity of the fluid in order to ensure the % viscometer torque has a minimum measurement greater than 10% and a maximum measurement less than 100%, where this is not possible the % viscometer torque may have a minimum measurement greater than 0% and a maximum measurement of less than 100%. For the viscosity measurements in the present specification the following spindles were used:
 Viscosity range 3 to 100 cP was measured using spindle SC4-18 at 10.6 rpm on an LV viscometer.
 Viscosity range 100 to 500 cP was measured using spindle SC4-28 at 50 rpm on an LV viscometer.
 Viscosity range 500 to 9000 cP was measured using spindle SC4-28 at 50 rpm on an RV viscometer.

BRIEF DESCRIPTION OF THE DRAWINGS

Aspects and embodiments of the present disclosure will now be described, by way of example only, with reference to the accompanying drawings, in which.

DETAILED DESCRIPTION

As used in this specification and the appended claims, the singular forms "a", "an" and "the" include plural referents unless the context clearly indicates otherwise. Thus, for example, reference to a "catalyst" includes a mixture of two or more catalysts, and the like.

As used in this specification the term "about" also includes the specific value. For example, "about 45%" includes about 45% and also 45% within its meaning.

The skilled reader will recognise that one or more features of one aspect or embodiment of the present disclosure may be combined with one or more features of any other aspect or embodiment of the present disclosure unless the immediate context teaches otherwise.

Figure 1:
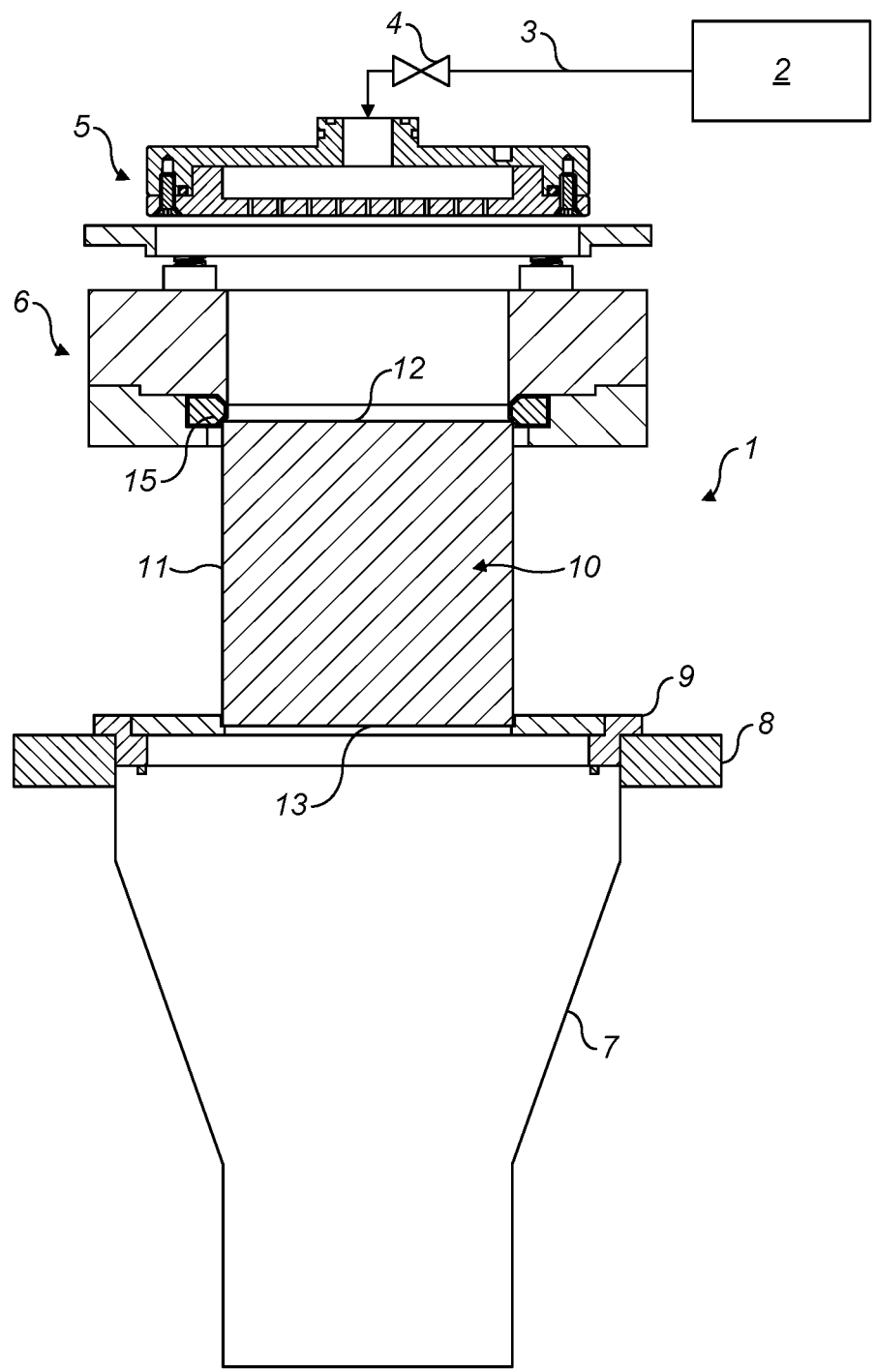
FIG. 1 is a schematic view of a substrate coating apparatus.

FIG. 1 shows a schematic view of a non-limiting example of a substrate coating apparatus 1 that may be used for coating a substrate 10 with a washcoat. The substrate coating apparatus 1 comprises a source 2 of a washcoat, a valve assembly 4, a washcoat showerhead 5, a headset 6, and a vacuum generator 7.

The substrate 10 may, for example, be of a type that comprises a substrate body 11 that has a uniform cross-sectional shape along its longitudinal length. Typically, the substrate body 11 may have a circular or near circular shape in cross-section. The substrate body 11 may be positioned in the substrate coating apparatus 1 such that an upper surface 12 of the substrate body 11 is uppermost and a lower surface 13 of the substrate body 11 is lowermost. The upper surface 12 and lower surface 13 may be planar and orthogonal to a longitudinal axis of the substrate body 11.

The source 2 of washcoat may supply in use washcoat to the valve assembly 4 via a conduit 3. The source 2 may take various forms. In one, non-limiting, example the source 2 may comprise a hopper reservoir of washcoat and a dispensing mechanism for feeding controlled volumes of the washcoat to the valve assembly 4 from the hopper reservoir. The dispensing mechanism may comprise, for example, a piston which is axially moveable within a bore for providing a motive force to displace washcoat into and or along the conduit 3 towards the valve assembly 4. The source 2 may comprise an on/off valve (such as a ball valve or diaphragm valve) located in between the hopper reservoir (or equivalent) and the valve assembly 4.

The substrate 10 may be located and positioned between the headset 6 and a pallet insert 9 or other substrate tooling. The pallet insert 9 or other substrate tooling may be mounted to a rotary table 8. The pallet insert 9 or other substrate tooling may be vertically movable relative to the rotary table 8 and headset 6. The rotary table 8 may enable the pallet insert 9 or other substrate tooling to be moved laterally relative to the headset 6.

The washcoat showerhead 5 is configured for discharging the washcoat towards the upper surface 12 of the substrate 10. The washcoat showerhead 5 may be located above the headset 6 and may be aligned with the headset 6 and substrate 10 such that a central longitudinal axis of the washcoat showerhead 5 is coincident with a central longitudinal axis of both the headset 6 and substrate body 11.

The headset 6 is configured for engaging the substrate 10 to locate the upper surface 12 of the substrate 10 below the washcoat showerhead 5. The headset 6 may comprise a headset seal 15 that may engage an upper edge circumscribing the upper surface 12 of the substrate body 11. The headset seal 15 may comprise an annular ring that extends fully around the headset 6.

The vacuum generator 7 is configured for drawing the washcoat discharged from the washcoat showerhead 5 through the substrate 10. The vacuum generator 7 may comprise a vacuum cone that may be located beneath the substrate 10. The vacuum generator 7 may be configured to apply a suction force to a lower surface 13 of the substrate 10. The vacuum generator 7 may comprise an apparatus or combination of apparatus that function to produce a pressure reduction. Non-limiting examples of suitable apparatus include vacuum generators that operate on the venturi principle, vacuum pumps, for example rotary vane and liquid ring vacuum pumps, and regenerative blowers.

The valve assembly 4 is configured for controlling flow of the washcoat into the washcoat showerhead 5.

Figure 2:
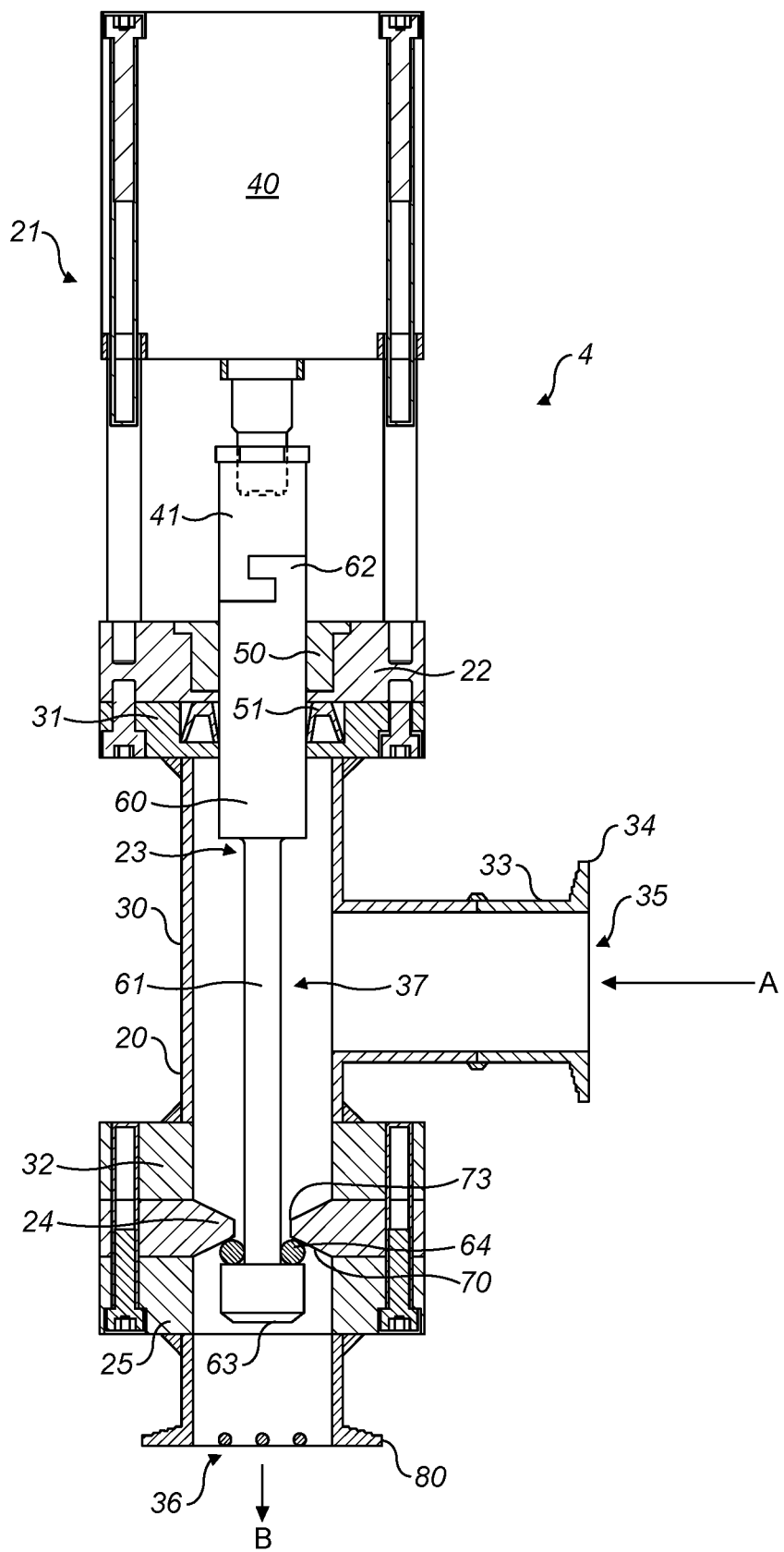
FIG. 2 is a cross-sectional view of a first example of a valve assembly for a substrate coating apparatus.
Figure 3:
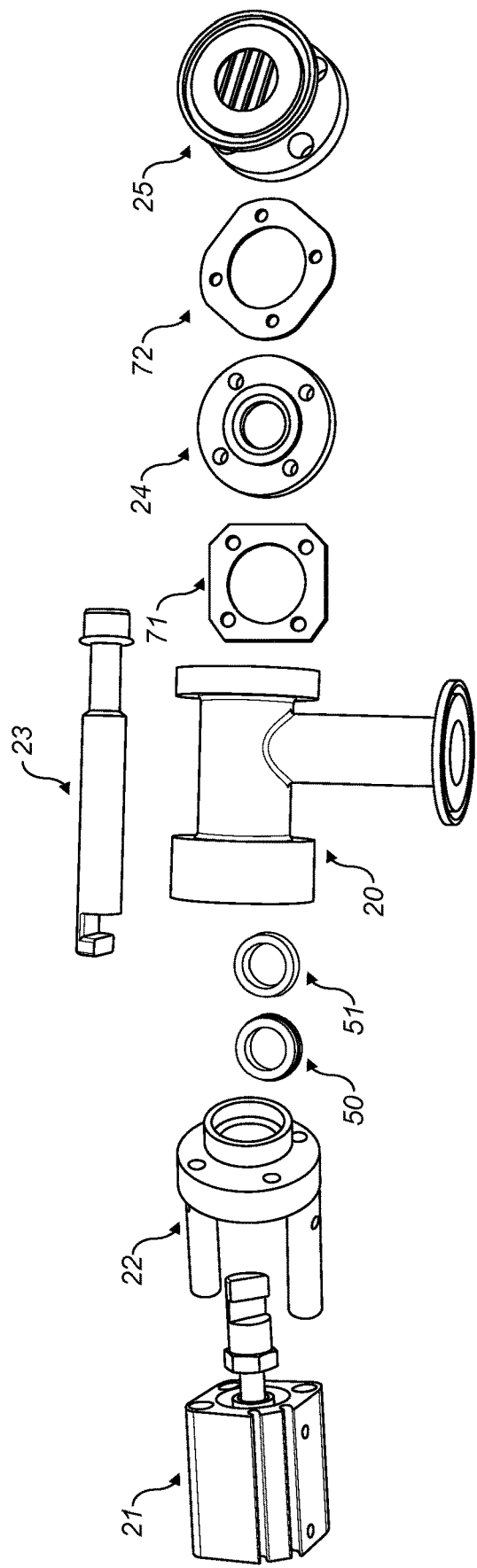
FIG. 3 is a photograph of the valve assembly of FIG. 2 in a disassembled state with certain parts omitted for clarity.

A first example of a valve assembly 4 according to the present disclosure is shown in FIGS. 2 and 3. The valve assembly 4 may comprise a valve body housing 20, a valve stem actuator 21, a valve stem 23, and a valve seat 24.

The valve assembly 4 comprises an inlet 35 for receiving the washcoat supplied from the source 2 of washcoat, an outlet 36 for supplying the washcoat to the washcoat showerhead 5, and a valve chamber 37.

The valve body housing 20 may, for example, have a T-shaped configuration comprising a longitudinal portion 30 and a lateral portion 33. It will be understood that such a configuration is merely one possible example and other configurations for the valve body housing 20 may be used.

The longitudinal portion may extend between an upper end 31, provided for coupling directly or indirectly to the valve stem actuator 21, and a lower end 32, provided for coupling directly or indirectly to the washcoat showerhead 5.

The upper end 31 may be directly coupled to the valve stem actuator 21. Alternatively, as shown in FIG. 2, the coupling may be indirect with an actuator coupling 22 provided that is interposed between the upper end 31 and the valve stem actuator 21. The valve stem actuator 21 may be coupled to the valve body housing 20 by fixatives, for example by bolts, that pass through the actuator coupling 22.

The lower end 32 may be directly coupled to the washcoat showerhead 5 and therefore define the outlet 36. Alternatively, as shown in FIG. 2, the coupling may be indirect with the valve seat 24 and an outlet coupling 25 provided that are interposed between the lower end 32 and the washcoat showerhead 5. In this example the outlet coupling 25 defines the outlet 36. The outlet coupling 25 may be coupled to the valve body housing 20 by fixatives, for example by bolts that pass through the outlet coupling 25. A first gasket seal 71, shown in FIG. 3, may be interposed between the valve body housing 20 and the valve seat 24, and a second gasket seal 72, also shown in FIG. 3, may be interposed between the valve seat 24 and the outlet coupling 25 to ensure a fluid-tight coupling of the washcoat showerhead 5 to the valve assembly 4.

Figure 4:
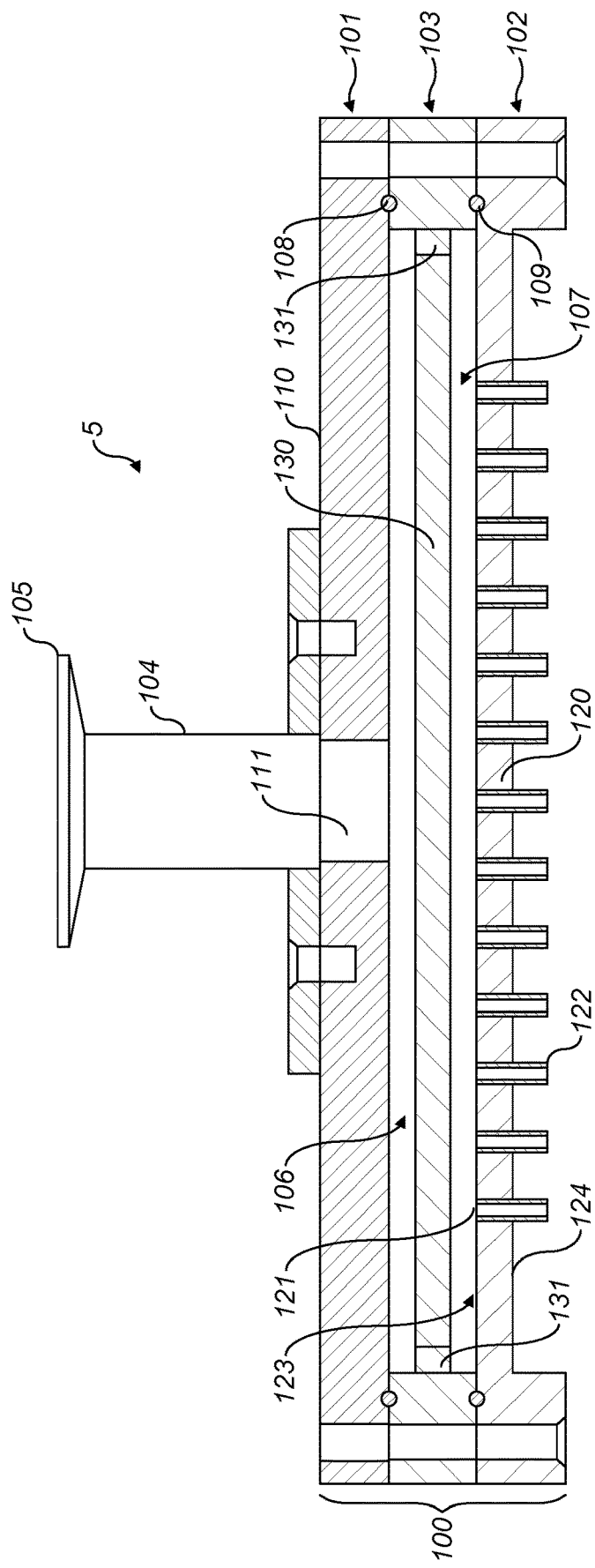
FIG. 4 is an exploded cross-sectional view of a washcoat showerhead for a substrate coating apparatus.

The outlet coupling 25 may comprise a flange 80 that may be sized and shaped to couple to a flange 105 of the washcoat showerhead 5, shown in FIG. 4.

The lateral portion 33 may extend between the longitudinal portion 30 and the inlet 35. A mounting 34 may be provided at the inlet end of the lateral portion 33 for coupling directly or indirectly the valve body housing 20, and hence the valve assembly 4, to the conduit 3. The mounting 34 may comprise a flange, screw fitting or other means for coupling the conduit 3 in a fluid-tight manner to the valve assembly 4.

The longitudinal portion 30 and the lateral portion 33 may each comprise a hollow bore that are interconnected where they intersect one another such that washcoat is free to flow from the lateral portion 33 into the longitudinal portion 30 during use.

The valve stem actuator 21 may comprises an actuator body 40 and an actuator stem 41. The actuator stem 41 may be configured to engage an upper end 62 of the valve stem 23. The actuator stem 41 and upper end 62 may be fixedly attached or releasable attached together. The actuator stem 41 and the upper end 62 may be mutually shaped to form an interlocking formation. The interlocking formation may comprise mutual projections and undercuts that can interlock with one another.

The valve stem actuator 21 may be a pneumatic, hydraulic or electro-mechanical actuator. The actuator body 40 may comprise inlet and or outlet connections for coupling to a pneumatic, hydraulic or electrical source of power.

The valve stem 23 may comprise an elongate member. The elongate member may comprise a single component or multiple components that are assembled together.

The valve stem 23 may comprises an upper portion 60 and a lower portion 61. The upper portion 60 may be a cylindrical portion of a first diameter. The upper end 62 may be provided at an upper end of the upper portion 60. The lower portion 61 may be a cylindrical portion of a second diameter. The first diameter may be greater than the second diameter.

The valve stem 23 may comprise an enlarged valve stem head 63. The enlarged valve stem head 63 may be provided at a lower end of the enlarged valve stem head 63, optionally at a lower end of the lower portion 61.

The valve stem 23 may comprise a valve stem seal 64. The valve stem seal may be located adjacent a proximal face of the enlarged valve stem head 63. The valve stem seal 64 may comprise an O-ring, for example an EPDM O-ring.

The valve seat 24 may define a sealing surface 70 to be engaged by the valve stem 23 and or valve stem seal 64. The sealing surface 70 may be on a downstream face of the valve seat 24 facing the outlet 36. The valve seat 24 may define an aperture 73. The valve seat 24 may be annular with the aperture 73 arranged as a central passage surrounded by the sealing surface 70.

The valve seat 24 may be formed integrally with the valve body housing 20. Alternatively, as shown in FIG. 2 the valve seat 24 may be formed as a separate component that is coupled to the valve body housing 20. In the illustrated example the bolts that couple the outlet coupling 25 to the valve body housing 20 also pass through the valve seat 24. As noted above, the first gasket seal 71 may be interposed between the valve body housing 20 and the valve seat 24 and the second gasket seal 72 may be interposed between the valve seat 24 and the outlet coupling 25 to ensure a fluid-tight coupling of the washcoat showerhead 5 to the valve assembly 4.

The enlarged valve stem head 63 may be located downstream of the valve seat 24, i.e. the valve stem 23 may project through the aperture 73. The valve stem 23 may extend through the valve seat 24 in both the open state and the closed state of the valve assembly 4.

The valve stem 23 may be mounted to be reciprocally movable relative to the valve seat 24. As shown in FIG. 2, the upper portion 60 of the valve stem 23 may project through the upper end 31 of the longitudinal portion 30 and the actuator coupling 22 to be engaged with the actuator stem 41 of the valve stem actuator 21.

A rod seal or bushing 50 may be provided between the actuator coupling 22 and the valve stem 23. The rod seal or bushing 50 may function to provide lateral support to the valve stem 23 to assist in maintaining the alignment of the valve stem 23 relative to the longitudinal portion 30 of the valve body housing 20.

A wiper seal 51 may be provided between the upper end 31 and the valve stem 23. The wiper seal 51 may function to provide a fluid seal between the valve stem 23 and the valve body housing 20 to prevent leakage of washcoat in use out of the upper end 31. The wiper seal 51 may be configured as a slidable seal able to maintain a fluid-tight seal during reciprocal movement of the valve stem 23 relative to the wiper seal 51.

The functions of the rod seal or bushing 50 and the wiper seal 51 may be combined in a single seal component.

The rod seal or bushing 50 and or the wiper seal 51 and or the single seal component may be formed, for example, from EPDM, a fluoroelastomer (e.g. Viton®) or polyurethane.

The valve chamber 37 may comprise at least a portion of an interior of the valve body housing 20. The valve chamber 37 may comprise at least a portion of the hollow bores of the longitudinal portion 30 and the lateral portion 33.

In some examples a portion of a boundary of the valve chamber 37 may be demarcated by the valve body housing 20. Another portion of the boundary of the valve chamber 37 may be demarcated by the intersection of the seal 51 with the valve stem 23. Another portion of the boundary of the valve chamber 37 may be demarcated by the intersection of the valve stem seal 64 with the valve seat 24. Another portion of the boundary of the valve chamber 37 may be demarcated by an inlet valve provided for sealing the inlet 35. Such an inlet valve may form a part of the valve assembly 4. Alternatively, the inlet valve may be provided in a component coupled to the inlet 35 of the valve assembly 4 or be provided within the conduit 3 or source 2 itself.

The valve stem 23 and the valve seat 24 may together function as an outlet valve movable between a closed state and an open state to control flow of washcoat out of the outlet 36. The outlet valve may comprise a reverse poppet valve.

In the closed state of the outlet valve the valve stem seal 64 may seal against the sealing surface 70 to close off the aperture 73. In the open state of the outlet valve the valve stem seal 64 may be disengaged from the sealing surface 70 to open the aperture 73.

The valve assembly 4 is configured to create a pressure drop within the valve chamber 37 when the outlet valve moves from its open state to its closed state. In some examples this may comprise the valve stem 23 functioning as a piston within the valve chamber 37. Thus, the valve stem 23 may be considered a valve piston.

For example, FIG. 2 illustrates the outlet valve in the closed state. In order to discharge washcoat out of the outlet 36 (in the direction of arrow B) into the washcoat showerhead 5 the valve stem 23 must be moved downwards relative to the valve seat 24 to disengage the valve stem seal 64 from the sealing surface 70. During this movement the valve stem 23 is extended towards the outlet 36. In addition, the inlet valve must be in an open state to permit washcoat to enter the valve body housing 20 through the inlet 35. The source 2 may then be activated to transfer washcoat along the conduit 3, into the valve chamber 37 through inlet 35 (in the direction of arrow A), through the aperture 73 in the valve seat 24 and out of the outlet 36 into the washcoat showerhead 5 located downstream of the valve assembly 4.

When it is desired to stop discharge of the washcoat the inlet valve may be closed to stop conveyance of any additional washcoat into the inlet 35. In addition, closing the inlet valve may also create a fluid-tight seal at or upstream of the inlet 35 preventing backflow of washcoat present within the valve chamber 37 through the inlet 35.

In addition, simultaneously or subsequently to closing the inlet valve, the valve stem 23 may be moved upwards by the valve stem actuator 21 to close the outlet valve by engaging the valve stem seal 64 against the sealing surface 70 of the valve seat 24. In particular, the valve stem 23 may be configured to be pulled into sealing engagement with the valve seat 24 in the closed state of the outlet valve by the valve stem actuator 21.

The valve stem 23 may act as a valve piston such that the upward movement of the valve stem 23 causes the pressure drop within the valve chamber 37. The washcoat showerhead 5 may be coupled in a fluid-tight manner to the valve assembly 4. Hence, a pressure drop within the valve chamber 37 may also cause a pressure drop within the washcoat showerhead 5.

Figure 5:
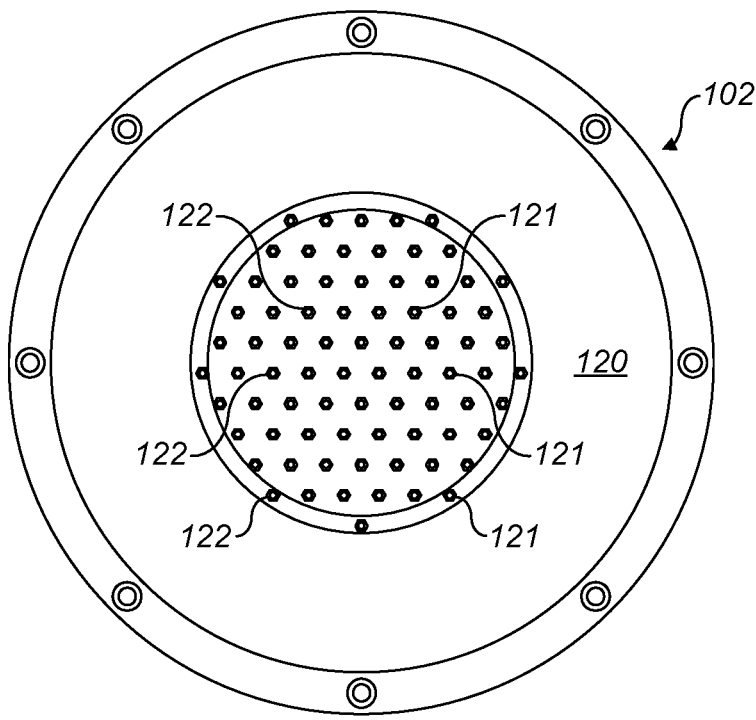
FIG. 5 is a plan view from below of the washcoat showerhead of FIG. 4.
Figure 6:
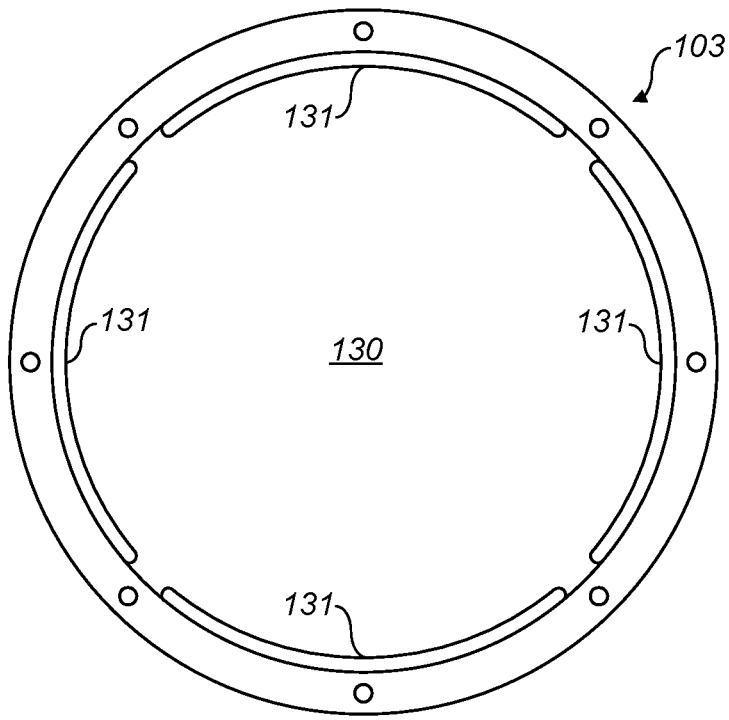
FIG. 6 is a plan view from below of a baffle layer of the washcoat showerhead of FIG. 4.

An example of the washcoat showerhead 5 according to the present disclosure is shown in FIGS. 4 to 6. The washcoat showerhead 5 may comprise a housing 100 comprising an upper layer 101 having a fluid connection to the outlet 36 of the valve assembly 4 and a lower layer 102 comprising an array of apertures 121 for discharging the washcoat towards the upper surface 12 of the substrate 10.

The fluid connection may comprise a conduit 104 provided with a flange 105 sized and shaped to mate sealingly with the flange 80 of the valve assembly 4. The conduit 104 may define an inlet to an interior of the washcoat showerhead 5 which may be arranged on a central axis of the washcoat showerhead 5.

The upper layer 101 may comprise a body 110 provided with a central aperture 111 which may be aligned with the conduit 104.

The lower layer 102 may comprise a body 120 that contains the array of apertures 121. The array of apertures 121 may comprise a plurality of equi-spaced apertures. The apertures may be arranged in a regular pattern as shown in FIG. 5. The regular pattern may be a hexagonal pattern of apertures wherein each aperture is surrounded by six apertures.

An inner diameter of each aperture may be 1.5 to 2.5 mm, optionally about 2 mm, optionally 2 mm.

Each aperture may be defined by a tubular insert 122. The tubular inserts 122 may be formed from stainless steel, for example Grade 316 stainless steel. The inner diameter of the tubular insert 122 may define the inner diameter of the aperture and may be 1.5 to 2.5 mm, optionally about 2 mm, optionally 2 mm. The tubular inserts 122 may extend below a lower face 124 of the lower layer 102. It has been found to be beneficial for the tubular inserts 122 to extend below the lower face 124 of the lower layer 102 as this helps to prevent the washcoat clinging to the surface of the lower face 124. Washcoat clinging to the lower face 124 in the vicinity of the apertures may build up and at least partially obstruct the apertures leading to non-uniform deposition of the washcoat onto the upper surface 12 of the substrate 10. In addition a build-up of washcoat on the lower face 124 may dry and harden and flake off or fall onto the upper surface 12 of a substrate 10 leading to potential blockage of one or more channels of the substrate 10 and or aesthetic degradation of the final product. Preferably the tubular inserts 122 extend below the lower face 124 of the lower layer 102 by at least 1 mm, more preferably by at least 2 mm, most preferably by at least 5 mm, or by about 5 mm or by 5 mm.

The washcoat showerhead 5 may further comprise a baffle layer 103 which is configured to direct washcoat that flows centrally into an upper portion 106 of the interior to flow towards a periphery of the interior. The baffle layer 103 may be configured to then convey the washcoat into a lower portion 107 of the interior at or near the periphery of the interior such that the washcoat is subsequently directed to flow inwards across an upper face 123 of the lower layer 102 towards a centre of the lower layer 102. To this end the baffle layer 103 may be provided with one or more transfer apertures 131 as shown in FIG. 6. The one or more transfer apertures 131 may be located near the periphery of the baffle layer 103. Each transfer aperture 131 may comprise an arcuate aperture. Three, four, five or more transfer apertures 131 may be provided.

The upper layer 101, lower layer 102 and baffle layer 103 may be connected together using fixatives, for example, bolts, that pass through bolt holes provided in each layer as shown in the exploded view of FIG. 4. The upper layer 101, baffle layer 103 and lower layer 102 may be sealed together. Thus, the housing of the washcoat showerhead 5 may be fluid-tight except for the inlet defined by conduit 104 and the outlets defined by the array of apertures 121. In this way, a pressure drop within the valve chamber 37 of the valve assembly 4 may also produce a pressure drop within the interior of the housing of the washcoat showerhead 5. In particular, a pressure drop within the valve chamber 37 of the valve assembly 4 may also produce a pressure drop at the upper ends of each of the apertures of the array of apertures 121. For example, at least a first O-ring seal 108 may be provided between the upper layer 101 and the baffle layer 103 and at least a second O-ring seal 109 may be provided between the baffle layer 103 and the lower layer 102.

The upper layer 101, lower layer 102 and baffle layer 103 may be formed from a metal, for example a stainless steel, or an engineering plastic, for example POM (polyoxymethylene).

When assembled together, the upper layer 101 and the baffle layer 103 may be separated by a first gap, and optionally the first gap may be 3.0 to 5.0 mm, optionally about 4.0 mm, optionally 4.0 mm. The baffle layer 103 and the lower layer 102 may be separated by a second gap, and optionally the second gap may be 3.0 to 5.0 mm, optionally about 4.0 mm, optionally 4.0 mm.

In use, the substrate 10 may first be engaged with the headset 6 of the substrate coating apparatus 1 so as to locate the upper surface 12 of the substrate 10 below the washcoat showerhead 5. Washcoat may then be conveyed from the source 2 of the washcoat towards the washcoat showerhead 5. The valve assembly 4 may be used to control flow of the washcoat from the source 2 into the interior of the washcoat showerhead 5. Thus, washcoat may be discharged out of the washcoat showerhead 5 onto the upper surface 12 of the substrate 10. Thereafter the washcoat may be drawn through the substrate 10 by applying a suction force to a lower surface 13 of the substrate 10. The outlet valve of the valve assembly 4 may be moved between its closed state and its open state to control flow of washcoat into the interior of the washcoat showerhead 5. When the outlet valve is moved from its open state to its closed state a pressure drop is created within an interior of the washcoat showerhead 5. This pressure drop may advantageously act to mitigate dripping and or leakage of washcoat from the apertures of the washcoat showerhead 5 by creating a suction force at the upper end of each of the array of apertures 121 (or tubular inserts 122 where present).

Figure 7:
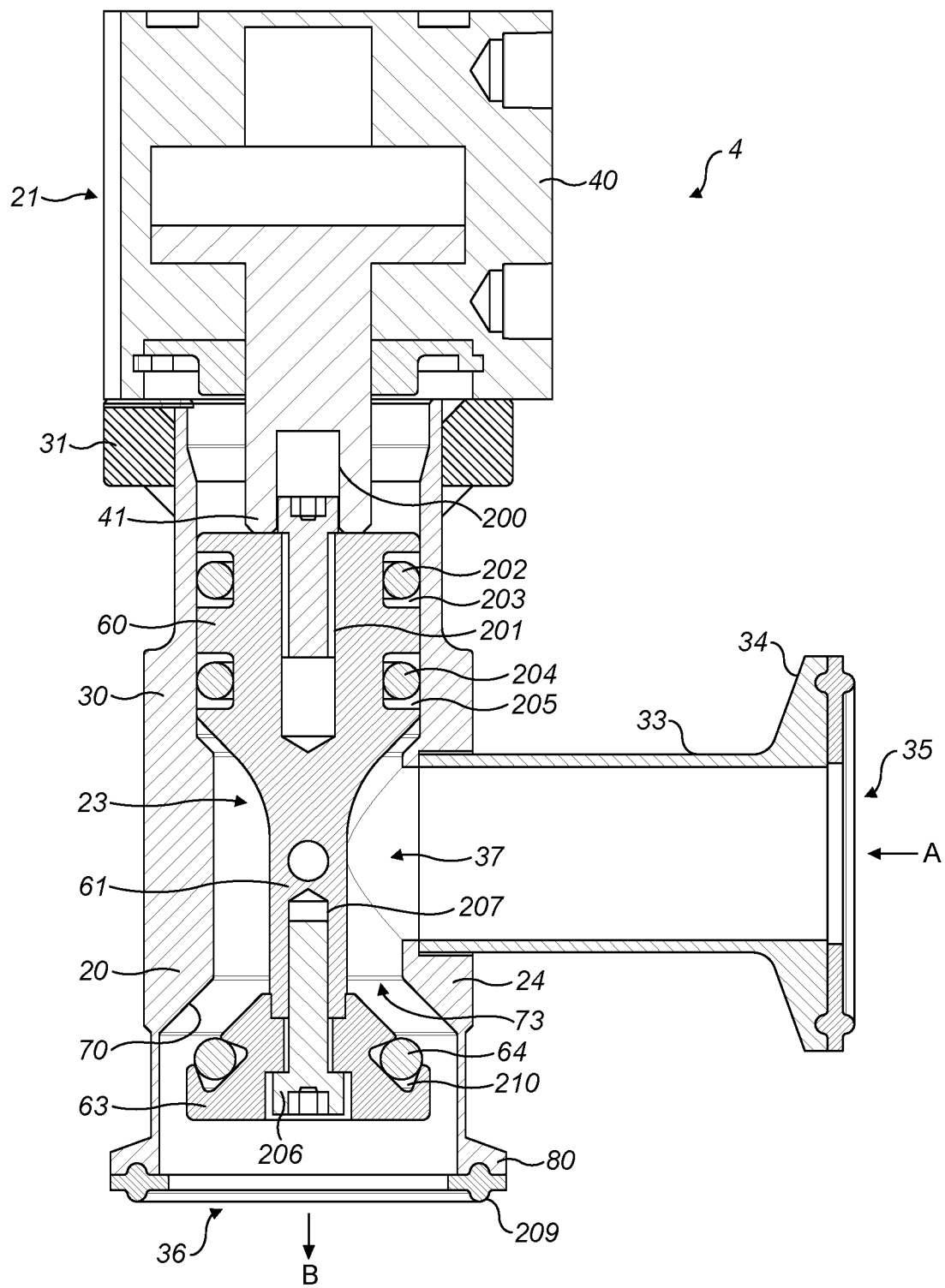
FIG. 7 is a cross-sectional view of a second example of a valve assembly for a substrate coating apparatus.

FIG. 7 shows a second example of a valve assembly 4 for the substrate coating apparatus 1. Features of the valve assembly 4 that are the same or substantially the same as the valve assembly 4 of FIGS. 2 and 3 have been referenced with the same reference numerals and will not be described in further detail. Reference should be made to the above description. In addition, this second example of valve assembly 4 may be used in the same substrate coating apparatus 1 as described above in exchange for the first example of valve assembly 4. As such other parts of the substrate coating apparatus 1 will not be described further. Reference should be made to the above description.

As above the second example of valve assembly 4 may comprise a valve body housing 20, a valve stem actuator 21, a valve stem 23, and a valve seat 24.

The valve body housing 20 may be formed from fewer separate components than in the first example. For example, the flange 80 and the valve seat 24 may be integrated as part of the longitudinal portion 30. The valve seat 24 may comprise an annular surface of the longitudinal portion 30. The annular surface may be forward-facing, i.e. pointing towards the outlet 36.

Additionally or alternatively, the valve stem actuator 21 may be directly coupled to the upper end 31 of the valve body housing 20 without an intervening actuator coupling.

Additionally or alternatively, the actuator stem 41 of the valve stem actuator 21 may be coupled to the upper portion 60 of the valve stem 23 by means of fixative, for example a bolt, engaged between bolt holes 200 and 201 in, respectively, the valve stem actuator 21 and the valve stem 23. Use of the fixative may obviate the need for a busing to maintain alignment of the valve stem 23 as in the first example.

Additionally or alternatively, the valve stem 23 may be provided with one or more sliding seals 202, 204 for sealing the upper portion 60 to the longitudinal portion 30 of the valve body housing 20. Two sliding seals 202, 204 may be provided. Each sliding seal 202, 204 may be an O-ring seal. Each sliding seal 202, 204 may be located in an annular recess 203, 205 in the upper portion 60.

Additionally or alternatively, the enlarged valve stem head 63 of the valve stem 23 may be a separate part that is coupled to a remainder of the valve stem 23 by a fixative, for example a bolt, engaged between bolt holes 207 and 206 in, respectively, the lower portion 61 and the enlarged valve stem head 63.

Additionally or alternatively, the valve stem seal 64 may be located in an annular recess 210 in a backward-facing surface of the enlarged valve stem head 63, i.e. in a surface pointing away from the outlet 36.

The inlet 35 may be provided with a gasket seal 208 for sealing engagement with the conduit 3. The outlet 36 may be provided with a gasket seal 209 for sealing engagement with the washcoat showerhead 5.

Operation of the second example of the valve assembly 4 is substantially the same as for the first example as described above.

EXAMPLES

In the following examples comparison is made between the operation of the valve assembly 4 and or the washcoat showerhead 5 of the present disclosure as described above and shown in FIG. 2, compared to the operation of a valve assembly 4' and or a washcoat showerhead 5' not according to the disclosure described above.

Figure 8:
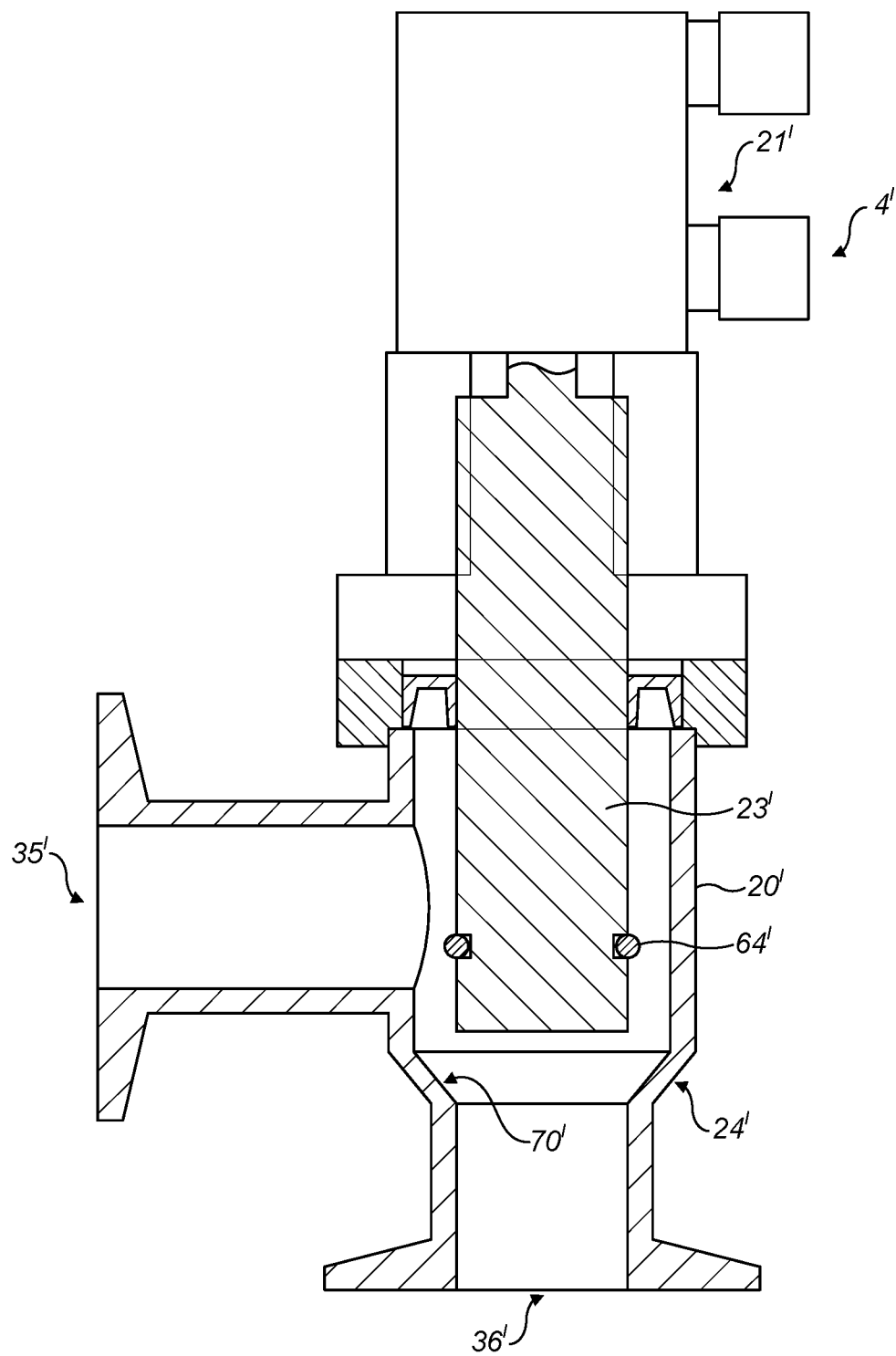
FIG. 8 is a cross-sectional view of a comparative valve.

The comparative valve assembly 4' is shown in FIG. 8. The design is similar to the valve assembly 4 shown in FIG. 2. In particular, the valve assembly 4' comprises a valve body housing 20', a valve stem actuator 21', a valve stem 23', and a valve seat 24'. The valve stem 23' carries a valve stem seal 64'. The valve seat 24' defines a sealing surface 70' to be engaged by the valve stem seal 64'. The valve assembly 4' comprises an inlet 35' for receiving the washcoat and an outlet 36' for supplying the washcoat to a washcoat showerhead. In contrast to the valve assembly 4 of the present disclosure described above, the valve stem 23' of the valve assembly 4' of FIG. 8 is moved downwards by the valve stem actuator 21' to engage the valve stem seal 64' against the sealing surface 70' of the valve seat 24'. In particular, the valve stem 23' is pushed into sealing engagement with the valve seat 24' in the closed state of the valve assembly 4'.

Figure 9:
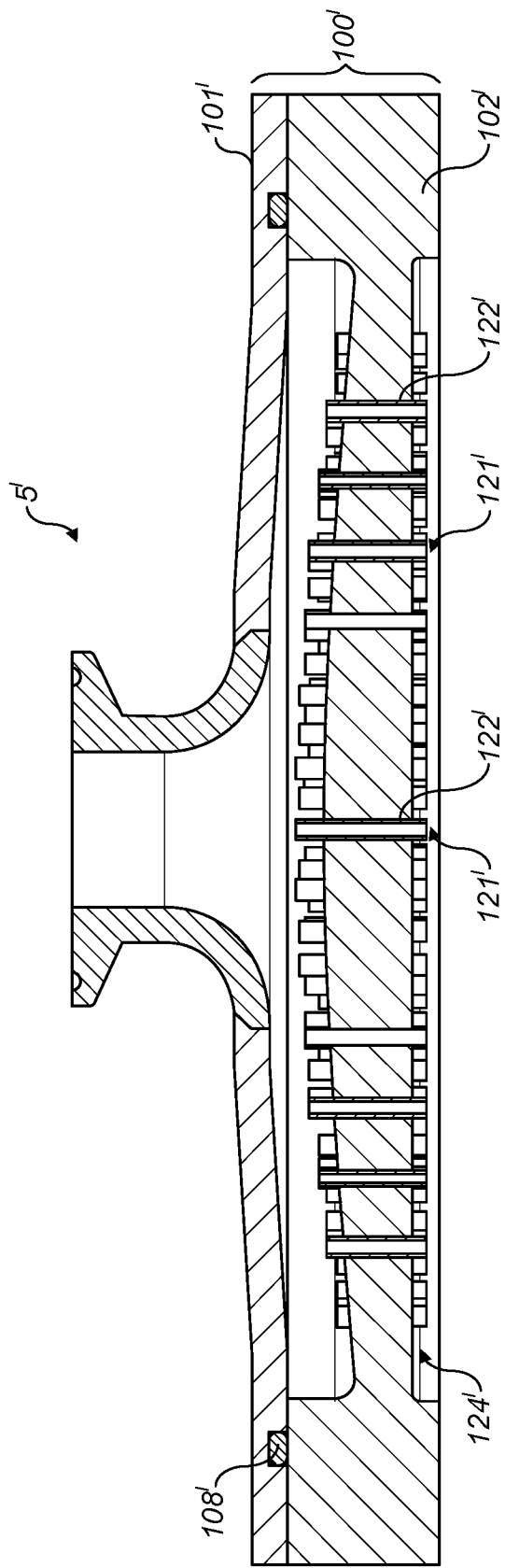
FIG. 9 is a cross-sectional view of a comparative washcoat showerhead.

The comparative washcoat showerhead 5' is shown in FIG. 9. The washcoat showerhead 5' comprises a housing 100' comprising an upper layer 101' having a fluid connection for receiving washcoat and a lower layer 102' comprising an array of apertures 121' for discharging the washcoat. Each aperture 121' is defined by a tubular insert 122'. The tubular inserts 122' extend below a lower face 124' of the lower layer 102' by a distance of 1 to 2 mm.

In the following examples a series of predetermined shots of three examples of washcoat were dispensed onto the upper surface of a series of substrates, each substrate receiving one shot of washcoat. A first washcoat had a solids content of 34% and a viscosity of 3000-3400 cP. A second washcoat had a solids content of 40% and a viscosity of 2000-2500 cP. A third washcoat had a solids content of <1% and a viscosity of 700-1200 cP.

Example 1

A combination of the comparative valve assembly 4' and the comparative washcoat showerhead 5' was tested. Following discharge of each shot of washcoat the number of drips was observed. A total of 50 drips of washcoat was observed to drip from the apertures 121' when the third washcoat was used, having a viscosity of 700-1200 cPs. A total of 30 drips of washcoat was observed to drip from the apertures 121' when the first washcoat was used having a viscosity of 3000-3400 cPs. When the second washcoat having a viscosity of 2000-2500 cPs was used the number of drips observed was between 30 and 50.

Example 2

A combination of the comparative valve assembly 4' and the washcoat showerhead 5 of the present disclosure was tested. Following discharge of each shot of washcoat the number of drips was observed. A total of 40 drips of washcoat was observed to drip from the apertures 121 when the third washcoat was used, having a viscosity of 700-1200 cPs. A total of 20 drips of washcoat was observed to drip from the apertures 121 when the first washcoat was used having a viscosity of 3000-3400 cPs. When the second washcoat having a viscosity of 2000-2500 cPs was used the number of drips observed was between 20 and 40.

Example 3

A combination of the valve assembly 4 of the present disclosure and the comparative washcoat showerhead 5' was tested. Following discharge of each shot of washcoat the number of drips was observed. A total of 10 drips of washcoat was observed to drip from the apertures 121' when the third washcoat was used, having a viscosity of 700-1200 cPs. A total of 5 drips of washcoat was observed to drip from the apertures 121' when the first washcoat was used having a viscosity of 3000-3400 cPs. When the second washcoat having a viscosity of 2000-2500 cPs was used the number of drips observed was between 5 and 10.

Example 4

A combination of the valve assembly 4 of the present disclosure and the washcoat showerhead 5 of the present disclosure was tested. Following discharge of each shot of washcoat a total of 0 to 2 drips of washcoat were observed to drip from the apertures 121 for each of the first, second and third washcoats.

As can be seen when comparing Examples 1 and 2, the use of the washcoat showerhead 5 of the present disclosure was found to have some limited benefit in reducing the amount of dripping when combined with the comparative valve assembly 4'.

As can be seen when comparing Examples 1 and 3, the use of the valve assembly 4 of the present disclosure was found to have significant benefit in reducing the amount of dripping when combined with the comparative washcoat showerhead 5'. Without wishing to be bound by theory it is believed that the pressure drop, caused on closing of the valve assembly 4, helps to create a suction force that reduces dripping of the washcoat.

However, as can be seen when comparing Example 4 with the other Examples, the most beneficial result was found when combining the valve assembly 4 of the present disclosure with the washcoat showerhead 5 of the present disclosure. With this combination the problem of dripping was substantially or entirely eliminated for a variety of washcoats of varying viscosity. Without wishing to be bound by theory it is believed that the combination of the pressure drop, caused on closing of the valve assembly 4, and the use of the baffle layer 103 and or the tubular inserts 122 helps to create a more effective suction force across the entire array of the apertures 121 that reduces or eliminates dripping of the washcoat.

Further aspects and embodiments of the present disclosure are set out in the following clauses:

Clause 1. A method of coating a substrate with a washcoat, comprising the steps of:
  engaging the substrate with a headset of a substrate coating apparatus so as to locate an upper surface of the substrate below a washcoat showerhead of the substrate coating apparatus;
  conveying washcoat from a source of the washcoat towards the washcoat showerhead;
  using a valve assembly to control flow of the washcoat from the source into an interior of the washcoat showerhead;
  discharging the washcoat out of the washcoat showerhead onto the upper surface of the substrate; and
  drawing the washcoat through the substrate by applying a suction force to a lower surface of the substrate;
  wherein the valve assembly comprises an outlet valve movable between a closed state and an open state to control flow of washcoat into the interior of the washcoat showerhead and the valve assembly creates a pressure drop within an interior of the washcoat showerhead when the outlet valve moves from its open state to its closed state.

Clause 2. The method of clause 1, wherein the outlet valve comprises a valve stem that reciprocates relative to a valve seat.

Clause 3. The method of clause 2, wherein the valve stem, or a valve seal provided on the valve stem, sealingly engages the valve seat in the closed state of the outlet valve.

Clause 4. The method of clause 2 or clause 3, wherein the valve stem, or the valve seal provided on the valve stem, sealingly engages a downstream face of the valve seat in the closed state of the outlet valve.

Clause 5. The method of any one of clauses 2 to 4, wherein the valve stem or the valve seal is pulled into sealing engagement with the valve seat in the closed state of the outlet valve.

Clause 6. The method of any one of clauses 2 to 5, wherein the valve stem extends through the valve seat in both the open state and the closed state.

Clause 7. The method of any one of clauses 2 to 6, wherein the valve assembly creates a pressure drop within a valve chamber of the valve assembly when moving from the open state to the closed state.

Clause 8. The method of clause 7, wherein the valve stem functions as a piston within the valve chamber and creates a pressure drop within the valve chamber when moving from the open state to the closed state Clause 9. The method of clause 7 or clause 8, wherein the valve stem extends towards the outlet when the outlet valve moves into its open state and retracts away from the outlet when the outlet valve moves into its closed state.

Clause 10. The method of any one of clauses 7 to 9, wherein a capacity of the valve chamber able to accommodate washcoat is greater in the closed state of the outlet valve than in the open state of the outlet valve.

Clause 11. The method of any one of clauses 2 to 10, wherein the valve stem is moved by a valve stem actuator, and optionally the valve stem actuator is a pneumatic, hydraulic or electro-mechanical actuator.

Clause 12. The method of any preceding clause, wherein, within the washcoat showerhead, the washcoat enters centrally into an upper portion of the interior, then flows towards a periphery of the interior, is then directed down into a lower portion of the interior and is then directed to flow inwards within the lower portion towards a centre of the washcoat showerhead.

Clause 13. The method of clause 12, wherein the washcoat is discharged from the lower portion of the interior through an array of apertures arranged in a lower layer of the washcoat showerhead.

Clause 14. A substrate coating apparatus comprising:
  a source of a washcoat;
  a washcoat showerhead for discharging the washcoat towards an upper surface of a substrate;
  a headset for engaging the substrate to locate the upper surface of the substrate below the washcoat showerhead; and
  a vacuum generator for drawing the washcoat discharged from the washcoat showerhead through the substrate;

the substrate coating apparatus further comprising a valve assembly for controlling flow of washcoat into the washcoat showerhead, the valve assembly comprising:
an inlet for receiving the washcoat supplied from the source of washcoat;
an outlet for supplying the washcoat to the showerhead; and
an outlet valve movable between a closed state and an open state to control flow of washcoat out of the outlet;
wherein the valve assembly is configured to create a pressure drop within an interior of the washcoat showerhead when the outlet valve moves from its open state to its closed state.

Clause 15. The substrate coating apparatus of clause 14, wherein the outlet valve comprises a valve stem configured for reciprocating movement relative to a valve seat.

Clause 16. The substrate coating apparatus of clause 15, wherein the valve stem, or a valve seal provided on the valve stem, is configured to sealingly engage the valve seat in the closed state of the outlet valve.

Clause 17. The substrate coating apparatus of clause 15 or clause 16, wherein the valve stem, or the valve seal provided on the valve stem, is configured to sealingly engage a downstream face of the valve seat in the closed state of the outlet valve.

Clause 18. The substrate coating apparatus of any one of clauses 15 to 17, wherein the valve stem or the valve seal is configured to be pulled into sealing engagement with the valve seat in the closed state of the outlet valve by a valve stem actuator.

Clause 19. The substrate coating apparatus of any one of clauses 15 to 18, wherein the valve stem extends through the valve seat in both the open state and the closed state.

Clause 20. The substrate coating apparatus of any one of clauses 15 to 19, wherein the valve assembly further comprises a valve chamber.

Clause 21. The substrate coating apparatus of clause 20, wherein the valve assembly is configured to create a pressure drop within the valve chamber when moving from the open state to the closed state.

Clause 22. The substrate coating apparatus of clause 20 or clause 21, wherein the valve stem is configured to function as a piston within the valve chamber to create a pressure drop within the valve chamber when moving from the open state to the closed state.

Clause 23. The substrate coating apparatus of any one of clauses 20 to 22, wherein the valve chamber of the valve assembly is sealed in a fluid-tight manner to the interior of the washcoat showerhead.

Clause 24. The substrate coating apparatus of any one of clauses 20 to 23, wherein the valve stem is extended towards the outlet when the outlet valve moves into its open state and is retracted away from the outlet when the outlet valve moves into its closed state.

Clause 25. The substrate coating apparatus of any one of clauses 20 to 24, wherein the valve assembly is configured such that a capacity of the valve chamber able to accommodate washcoat is greater in the closed state of the outlet valve than in the open state of the outlet valve.

Clause 26. The substrate coating apparatus of any one of clauses 15 to 25, wherein the valve stem comprises an enlarged valve stem head and comprises a valve stem seal located adjacent a proximal face of the enlarged valve stem head.

Clause 27. The substrate coating apparatus of clause 26, wherein the enlarged valve stem head is located downstream of the valve seat in both the open state and the closed state.

Clause 28. The substrate coating apparatus of clause 26 or clause 27, wherein the valve stem seal comprises an O-ring, optionally an EPDM O-ring.

Clause 29. The substrate coating apparatus of any one of clauses 14 to 28, further comprising a valve stem actuator, and optionally the valve stem actuator is a pneumatic, hydraulic or electro-mechanical actuator.

Clause 30. The substrate coating apparatus of any one of clauses 14 to 29, wherein the washcoat showerhead comprises a housing comprising an upper layer having a fluid connection to the outlet of the valve assembly and a lower layer comprising an array of apertures for discharging the washcoat towards the upper surface of a substrate.

Clause 31. The substrate coating apparatus of clause 30, wherein the array of apertures comprises a plurality of equi-spaced apertures.

Clause 32. The substrate coating apparatus of clause 30 or clause 31, wherein an inner diameter of the or each aperture is 1.5 to 2.5 mm, optionally about 2 mm, optionally 2 mm.

Clause 33. The substrate coating apparatus of any one of clauses 30 to 32, wherein the or each of the apertures is defined by a tubular insert.

Clause 34. The substrate coating apparatus of clause 33, wherein the tubular insert of the or each of the apertures extends below a lower face of the lower layer by at least 1 mm, more preferably by at least 2 mm, most preferably by at least 5 mm, or by about 5 mm or by 5 mm.

Clause 35. The substrate coating apparatus of any one of clauses 30 to 34, wherein the washcoat showerhead further comprises a baffle layer, which is configured to direct washcoat that flows centrally into an upper portion of the interior to flow towards a periphery of the interior.

Clause 36. The substrate coating apparatus of clause 35, wherein the baffle layer is configured to convey the washcoat into a lower portion of the interior at or near the periphery of the interior such that the washcoat is subsequently directed to flow inwards across an upper face of the lower layer towards a centre of the lower layer.

Clause 37. The substrate coating apparatus of clause 35 or clause 36, wherein the upper layer and the baffle layer are separated by a first gap, and optionally the first gap is 3.0 to 5.0 mm, optionally about 4.0 mm, optionally 4.0 mm.

Clause 38. The substrate coating apparatus of any one of clauses 35 to 37, wherein the baffle layer and the lower layer are separated by a second gap, and optionally the second gap is 3.0 to 5.0 mm, optionally about 4.0 mm, optionally 4.0 mm.

Clause 39. The substrate coating apparatus of any one of clauses 35 to 38, wherein the upper layer, baffle layer and lower layer are sealed together, and optionally comprise at least a first O-ring seal between the upper layer and the baffle layer and a second O-ring seal between the baffle layer and the lower layer.

Clause 40. The substrate coating apparatus of any one of clauses 14 to 39, wherein the outlet valve comprises a reverse poppet valve.

Clause 41. A valve assembly for a substrate coating apparatus comprising:
a valve chamber;
an inlet for receiving washcoat;
an outlet for supplying the washcoat to a showerhead; and
an outlet valve movable between a closed state and an open state to control flow of washcoat out of the outlet;
wherein the valve assembly is configured to create a pressure drop within the valve chamber when the outlet valve moves from its open state to its closed state.

Clause 42. The valve assembly of clause 41, wherein the outlet valve comprises a valve stem configured for reciprocating movement relative to a valve seat.

Clause 43. The valve assembly of clause 42, wherein the valve stem is configured to function as a piston within the valve chamber to create a pressure drop within the valve chamber when moving from the open state to the closed state.

Clause 44. The valve assembly of clause 42 or clause 43, wherein the valve stem, or a valve seal provided on the valve stem, is configured to sealingly engage the valve seat in the closed state of the outlet valve.

Clause 45. The valve assembly of clause 44, wherein the valve stem, or the valve seal provided on the valve stem, is configured to sealingly engage a downstream face of the valve seat in the closed state of the outlet valve.

Clause 46. The valve assembly of clause 44 or clause 45, wherein the valve stem or the valve seal is configured to be pulled into sealing engagement with the valve seat in the closed state of the outlet valve by a valve stem actuator.

Clause 47. The valve assembly of any one of clauses 42 to 46, wherein the valve stem extends through the valve seat in both the open state and the closed state.

Clause 48. The valve assembly of any one of clauses 42 to 47, wherein the valve stem is extended towards the outlet when the outlet valve moves into its open state and is retracted away from the outlet when the outlet valve moves into its closed state.

Clause 49. The valve assembly of any one of clauses 42 to 48, wherein the valve stem comprises an enlarged valve stem head and comprises a valve stem seal located adjacent a proximal face of the enlarged valve stem head.

Clause 50. The valve assembly of clause 49, wherein the enlarged valve stem head is located downstream of the valve seat in both the open state and the closed state.

Clause 51. The valve assembly of clause 49 or clause 50, wherein the valve stem seal comprises an O-ring, optionally an EPDM O-ring.

Clause 52. The valve assembly of any one of clauses 41 to 51, further comprising a valve stem actuator, and optionally the valve stem actuator is a pneumatic, hydraulic or electro-mechanical actuator.

Clause 53. The valve assembly of any one of clauses 41 to 52, wherein the outlet valve comprises a poppet valve.

Clause 54. The method of any one of clauses 1 to 13, wherein the substrate is selected from a flow-through substrate (e.g. a monolithic flow-through substrate) or a filter substrate (e.g. a wall-flow filter substrate).

Clause 55. The method of any one of clauses 1 to 13, wherein the washcoat comprises a catalytic coating selected from a three way catalyst (TWC), a selective catalytic reduction (SCR) catalyst, a diesel oxidation catalyst (DOC), a lean NOx trap catalyst (LNT), an ammonia slip catalyst (ASC), a combined selective catalytic reduction catalyst and ammonia slip catalyst (SCR/ASC), and a passive NOx adsorber (PNA).

Clause 56. The method of any one of clauses 1 to 13, wherein the washcoat has a viscosity of 3 to 9000 cP, optionally 3 to 54 cP, optionally 32 to 576 cP, optionally 23 to 422 cP, optionally 250 to 4500 cP, optionally 500 to 9000 cP.

The invention claimed is:

1. A method of coating a substrate with a washcoat, comprising the steps of:
    engaging the substrate with a headset of a substrate coating apparatus so as to locate an upper surface of the substrate below a washcoat showerhead of the substrate coating apparatus;
    conveying washcoat from a source of the washcoat towards the washcoat showerhead;
    using a valve assembly to control flow of the washcoat from the source into an interior of the washcoat showerhead;
    discharging the washcoat out of the washcoat showerhead onto the upper surface of the substrate; and
    drawing the washcoat through the substrate by applying a suction force to a lower surface of the substrate;
    wherein the valve assembly comprises an outlet valve movable between a closed state and an open state to control flow of washcoat into the interior of the washcoat showerhead and the valve assembly creates a pressure drop within an interior of the washcoat showerhead when the outlet valve moves from its open state to its closed state.

2. The method of claim 1, wherein the outlet valve comprises a valve stem that reciprocates relative to a valve seat.

3. The method of claim 2, wherein the valve stem or a valve seal provided on the valve stem is pulled into sealing engagement with the valve seat in the closed state of the outlet valve.

4. The method of claims 2, wherein the valve assembly creates a pressure drop within a valve chamber of the valve assembly when moving from the open state to the closed state.

5. The method of claim 4, wherein the valve stem functions as a piston within the valve chamber and creates a pressure drop within the valve chamber when moving from the open state to the closed state.

6. The method of claim 1, wherein, within the washcoat showerhead, the washcoat enters centrally into an upper portion of the interior, then flows towards a periphery of the interior, is then directed down into a lower portion of the interior and is then directed to flow inwards within the lower portion towards a centre of the washcoat showerhead.

* * * * *